(12) United States Patent
Page

(10) Patent No.: US 7,562,815 B2
(45) Date of Patent: Jul. 21, 2009

(54) GAMING SMART CARD

(75) Inventor: William Page, Wellington, FL (US)

(73) Assignee: Card Logistics Properties, Ltd., Hamilton (BM)

( * ) Notice: Subject to any disclaimer, the term of this patent is extended or adjusted under 35 U.S.C. 154(b) by 0 days.

(21) Appl. No.: 11/756,845

(22) Filed: Jun. 1, 2007

(65) Prior Publication Data

US 2007/0278294 A1 Dec. 6, 2007

Related U.S. Application Data

(60) Provisional application No. 60/810,113, filed on Jun. 1, 2006.

(51) Int. Cl.
*G06K 5/00* (2006.01)
(52) U.S. Cl. ...................... 235/380; 235/492
(58) Field of Classification Search ................. 235/380, 235/379, 381, 382, 383, 492, 375, 493
See application file for complete search history.

(56) References Cited

U.S. PATENT DOCUMENTS

| | | | |
|---|---|---|---|
| 6,105,865 A * | 8/2000 | Hardesty | 235/380 |
| 6,592,030 B1 * | 7/2003 | Hardesty | 235/380 |
| 6,898,299 B1 * | 5/2005 | Brooks | 382/115 |
| 7,331,515 B1 * | 2/2008 | Blackson et al. | 235/379 |
| 2006/0116877 A1 * | 6/2006 | Pickering et al. | 704/231 |
| 2006/0180660 A1 * | 8/2006 | Gray | 235/380 |
| 2006/0219776 A1 * | 10/2006 | Finn | 235/380 |
| 2007/0119924 A1 * | 5/2007 | Register et al. | 235/380 |

* cited by examiner

*Primary Examiner*—Thien M Le
(74) *Attorney, Agent, or Firm*—Sughrue Mion, PLLC

(57) ABSTRACT

A system has been developed which employs a Smart Card which is approximately the size and shape of an ordinary credit card that an individual can carry in their wallet. It contains a Smart Card chip or similar information storage device which contains information by which the person may be identified. It also contains financial information so the user can make purchases and receive credits. Wireless technologies are employed to provide communication between the Smart Card and a card reader. This card can be used in place of chips or coins in casinos and for on-line wagering.

12 Claims, 3 Drawing Sheets

GAMING SMART CARD

CROSS REFERENCE TO RELATED APPLICATIONS

This application claims the benefit of U.S. Application No. 60/810,113, entitled Gaming Smart Card, filed on Jun. 1, 2006, the entire disclosure of which is hereby incorporated by reference.

FIELD OF THE INVENTION

In view of the recent rise in gaming activities such as poker tournaments, video poker machines, slot machines, on-line gaming, etc. there is a need for a safe and secure electronic card to enable a person to place wagers and receive credit for winnings for these games.

BACKGROUND OF THE INVENTION

Currently many of these games require that an individual purchase chips or tokens which are issued by a casino or other establishment in which these games are played. This requires persons wishing to play these games go to a "cashier" to purchase the chips or tokens. This transaction is time consuming especially when a large number of people enter a gaming establishment. Many people use a credit card to purchase the chips or tokens. Valuable time is spent converting the credit available on a person's credit card into credit or chips usable in a casino or gaming establishment. Also, another person has gained access to an individual's credit account and may use this information for unscrupulous purposes at a later time. Recently a large number of credit cards have been counterfeited which leaves the casino or gaming establishment unable to collect the debt. Today's population embraces the use of credit or debit cards without a third party conducting the transaction. In this manner they fell secure that someone will not gain access to their credit or debit card information. Casinos and gaming establishments also like to keep track of how much an individual spends at a particular casino so that they may offer the individual rewards, etc.

DESCRIPTION OF THE PRIOR ART

U.S. Pat. No. 7,048,187, issued to Yu discloses a multi-card reader. The reader is designed to accept and read different memory cards which have diverse specifications, i.e. shape, thickness, width, length, and pin location. Different sized slots located at one end of the card reader allow for the insertion of memory cards having different specifications. Connecting terminals are associated with the different slots so that when a memory card is inserted into the proper slot the connection terminals will contact the contact elements on the card.

U.S. Published Patent Application No. 2005/0258243, filed by Hsieh discloses a multi-card reader. The reader is constructed and arranged to accept a plurality of different memory cards having different specifications. One end of the card reader is constructed to accept the different widths of the memory cards. Connecting terminals at located at different positions within the card reader to contact the contacts elements of the memory cards. The card reader is also provided with an information output 54 at another end of the reader.

U.S. Pat. No. 6,743,098, issued to Urie et al. discloses an account chip card used for gaming. The account chip card includes biometric data of the player and is linked to a casino's central office. The central office of the casino keeps track of the player's personal information, the player's chips, number of times the player has played different games, the player's comps, etc.

SUMMARY OF THE INVENTION

A system has been developed which employs a card which is approximately the size and shape of an ordinary credit card that an individual can carry in their wallet. It contains a smart card chip or similar device which contains information by which the person may be identified. It also contains financial information so the user can make purchases and receive credit. Wireless technologies are employed to provide communication between the card and a card reader.

Accordingly, it is an objective of the instant invention to provide an easily transportable card which can readily perform financial transactions.

It is a further objective of the instant invention to provide an easily transportable card on which a large variety of information may be stored and retrieved.

It is yet another objective of the instant invention to provide an easily transportable card with the ability to restrict access to certain information stored on the card.

It is a still further objective of the invention to provide an easily transportable card which is difficult to counterfeit.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

The instant invention comprises a system which utilizes cards, such as Smart Cards 10, which contain a microprocessor chip 12 or a similar information storage medium and a wireless device for communication with a card reader. While a smart card is illustrated as a preferred embodiment, any type of card which can be programmed or contain software could be employed. These Smart Cards are approximately the same size as conventional bank credit or debit cards. However, they can be made in any size to meet the specific needs of the customer. The Smart Card incorporates a microprocessor chip with a memory following ISO 7816 and 14443 standards. The memory size of a typical microprocessor chip is 256 K. This allows for the encryption of transmitted data. This encryption also permits a high level of security of the data contained on the chip. The large memory permits a large amount of data to be stored on the chip 12, as compared to magstripe cards which can only store 384 bytes of data. Information is retrieved from the Smart Card by the use of a card reader. The card reader is designed to communicate with the Smart Card chip or similar information storage device and provide the information stored on the chip 12 to a user in a readily accessible form. The card reader can be either a "contact" or "contactless" type. A contact type of card reader requires that the smart card be placed in contact with the card reader. The information stored on the chip 12 can then be transferred to the card reader. A contactless type of card reader requires that the smart card be held in proximity to the card reader. The information stored on the chip 12 can then be transferred to the card reader. The distance at which the smart card must be held to the card reader to permit transfer of data varies depending on the capabilities of the card reader.

Figure 1:
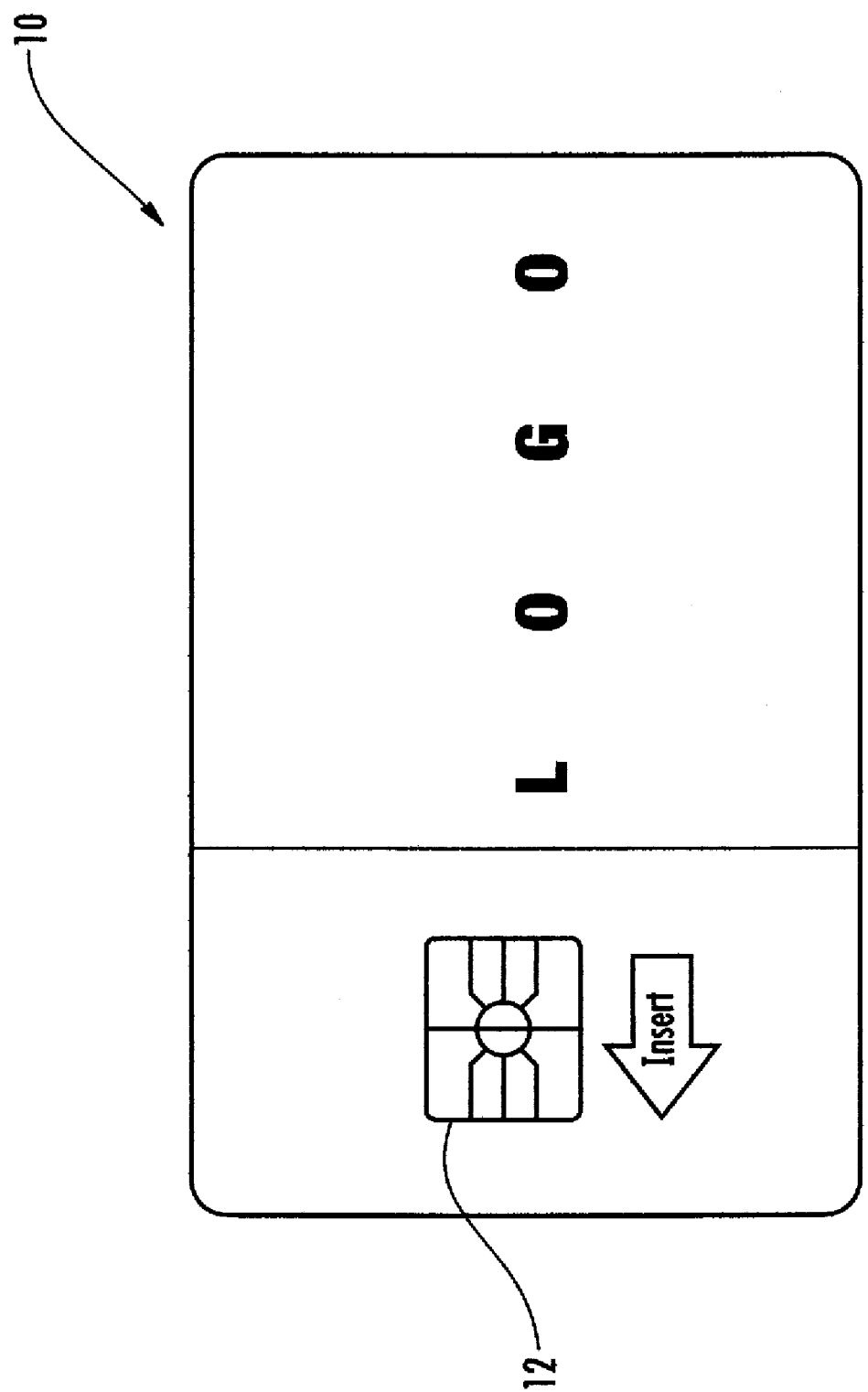
FIG. 1 is a front view of a smart card of the instant invention incorporating a smart chip.
Figure 2:
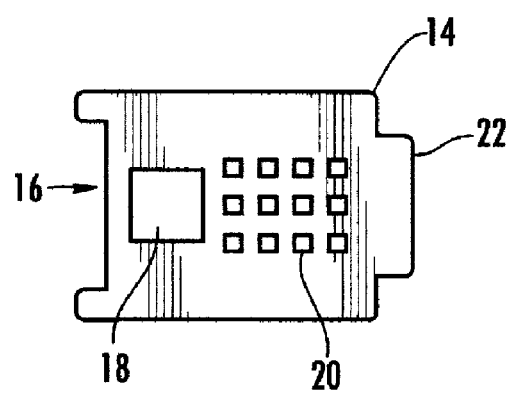
FIG. 2 is a top view of the card reader.

Preferably the smart card reader is a Mag-Smart card reader, as disclosed in U.S. patent application Ser. No. 11/683,208, filed Mar. 7, 2007, which is incorporated herein by reference. The smart card is inserted into the card reader at slot 16 at one end of the reader. The upper portion of a Mag-Smart reader contains at least two different input devices on the outer surface thereon. As illustrated in FIG. 2 a biometric pick-up or device 18 for measuring the biometric of a user/player and a numerical key pad 20 are located on the outer surface of Mag-Smart card reader 14. The biometric device 18 in the preferred embodiment is a fingerprint detector. However, detectors for other biometric properties could also be employed, such as hand scans, face scans, eye or retinal scans, voice detection, etc., to identify the user/player. The numerical key pad 20 is used to enter alphanumeric data into the card reader. The key pad can be used to enter a player's PIN number or other identification number. A connector 22, located at an end of the card reader, is constructed to be coupled to connector 24 on the data module 26. Data from the card reader 14 is transferred through connectors 22 and 24 to the data module 26. From the data module the data can be sent to various other locations as will be explained hereinafter.

Figure 4:
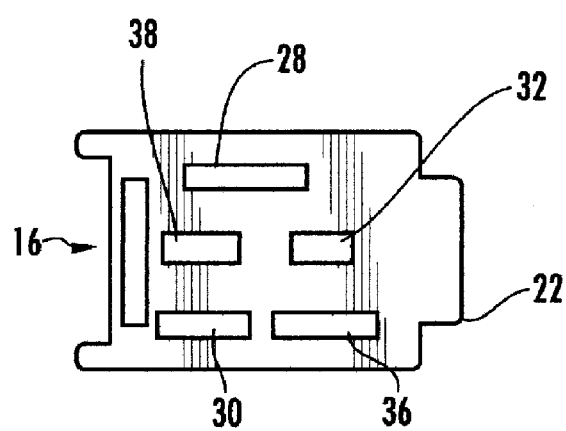
FIG. 4 is a horizontal cut away view of the card reader illustrating the location of the different read devices.

The interior of the Mag-Smart reader 14 is illustrated in FIG. 4. There are different sensors in different areas of the reader which pick up information from different types of cards. For example, if the information is stored on a magnetic strip as it is on many credit/debit cards in the U.S. the magstripe head 28 in the upper portion of the reader would read the information. If the information is stored in the form of a bar code then the bar code reader 30 in the lower portion of the reader would read the information. It the information is stored in a Smart Card chip then the smart card chip reader 32 would read the information. If the information is stored utilizing Mifare technology then a Mifare proximity reader 34 would read the information. If the information is stored utilizing Wiegand technology then a Wiegand reader 36 would read the information. A biometrics reader 38 would be able to read any biometric information stored on the card. In addition, if the information was stored on a single card utilizing different storage forms, for example magnetic stripe and smart card chip, the reader would be able to read all the information stored in all the different forms.

Figure 3:
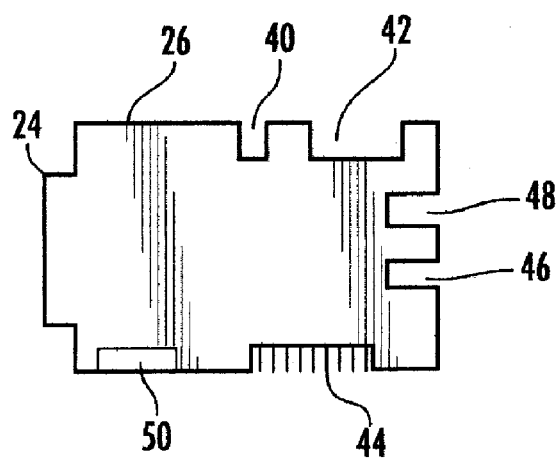
FIG. 3 is a top view of a data module with various connection options which is utilized to transmit the data to various devices.

Once the information is retrieved from the card 10 it is conveyed to the data module 26, illustrated in FIG. 3, via connections 22 and 24. The data module 26 has a plurality of different output connectors which enable data from the Mag-Smart reader 14 to be sent to various different devices such as a computer, a laptop computer, a personal digital assistant (PDA), a cellular telephone, etc. The various output connectors include a USB connector 40, a serial port connector 42, a RS 232/485 connector 44. Connector 46 enables a connection to a modem, such as those employed in conjunction with a public telephone system, for the transfer of data. Connector 48 enables a connection to networks, such as local area networks or wide area networks. This connector also enables connection to the Internet, thus enabling data to be transmitted via the Internet to almost any location on the earth. Connector 50 is a wireless Bluetooth communications connection. For example, utilizing the USB connection the data could be sent to a PDA or a cellular telephone. Utilizing the other connections the information could be sent to a local area network, a wide area network, the Internet, a cellular or satellite phone, etc.

Figure 5:
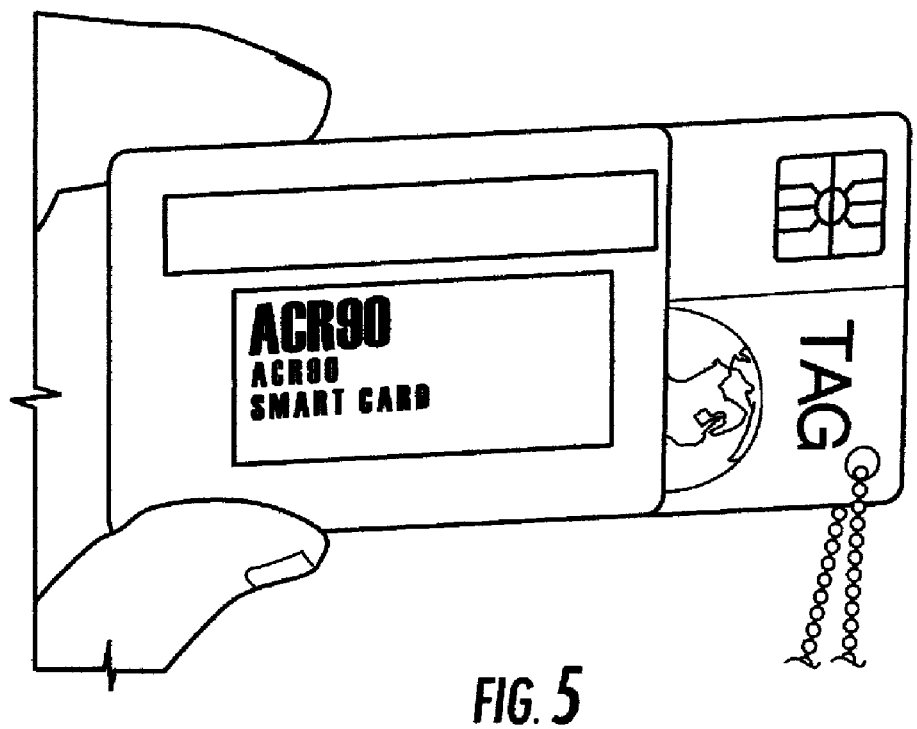
FIG. 5 is a view of the top portion of the card reader.
Figure 6:
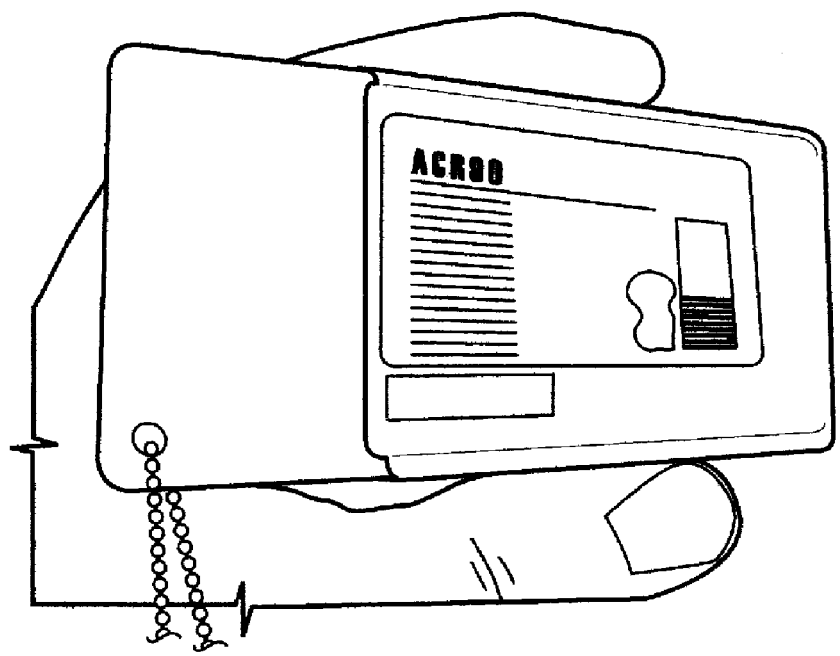
FIG. 6 is a view of the bottom portion of the card reader.

The smart card and reader may be a stand along device, as shown in FIGS. 5 and 6, or mounted to another device such as a slot machine, on-line gaming devices (slots, roulette, poker, blackjack, craps, baccarat, Caribbean poker), video poker machine, bingo machine, lottery machine, keno, fantasy sports games, wireless gaming devices, or table games. The card reader can be attached to a gaming device to replace or work in parallel with the mechanism which normally accepts chips or tokens. The card reader can also communicate on-line or wirelessly with a gaming device or system used to place bets or wagers. Software placed on the smart card enables a user/player to place bets on-line or wirelessly without having to reveal their credit card or financial institution information. One form of authorization for on-line or wireless gaming utilizes an authorization number or code provided in the smart card. Once a connection is established between the smart card and the gaming device or system used to place bets or wagers, the player places their bet on the gaming device or system and the appropriate amount of monies, chips or credit is withdrawn from the smart card and transferred to the gaming device or system. This enables the player to travel around a casino without carrying a large amount of chips. This also enables a player to leave the casino and return to their room if they want to do some on-line or wireless gaming.

The smart card and reader may be used to purchase chips or credit in a casino when provided with the appropriate software. The smart card is rechargeable and redeemable. Once a user/player obtains a card they can use it wherever it is accepted. They do not have to cash in their winnings and risk transporting them to a different location or home. If the smart card is linked to their bank account, the winnings can be directly deposited in their bank account without any risk of loss or delay. Funds can also be withdrawn from their bank account. If the card is lost, only the amount of money or chips remaining on the card are lost. If someone hacks into an on-line game or system only the monies on the card will be lost. Since access of the card is protected by biometric identification of the user/player, the user/player need not worry that someone else could access their bank account or other accounts linked to the card.

The smart card and reader can also be used to reward a user/player by providing them with complimentary amenities, loyalty points, loyalty values, etc. A casino will normally have a database containing information on players registered with that casino. This database may contain the following information: hold percentage, complimentary award rate, complimentary award limits, game eligibility (lockout), and other information.

Hold percentage would normally be in a range of high, medium or low. A low hold percentage benefits the player. If the casino wants to reward a "premium player" (those players with a high player rating) the player is assigned a low hold percentage so they will continue to gamble at that particular casino.

Complimentary award rates indicate how often a player should receive complimentary amenities. Complimentary award limits indicate the maximum number or volume of complimentary amenities each player should receive in a given time period (e.g. per night).

Game eligibility indicates if a player is qualified to play certain games. For example, a casino may reserve certain machines for its most frequent players.

The other information contained in the database could represent other variables that can be modified to customize a game so that a player maintains interest. For example, the number of player award points accumulated during a certain period of time could be increased by a multiplier to stimulate the player's interest in the game. The player's gambling history can be stored in this database so that a customized complimentary awards program could be developed for individual players. The information contained in the database could be restricted so that the player could view certain information such as chip balance, credit available, complimentary awards while the casino could view all the information. The viewing authorization would be contained within the player's card so that unauthorized individuals could not view this information.

Utilizing appropriate software the card reader and smart cards could also be employed for point of sale (POS) commercial applications such as casinos, hotels, retail sales, gas stations, parking garages, etc. These smart cards could also be utilized in a manner similar to credit/debit cards. They could be used to pay for hotel rooms, parking, dining, recreation, transportation, entertainment, merchandise, etc. In addition monies could be transferred to or from the smart card to an authorized financial institution including the bank at a casino, hotel or other establishment. Information regarding the financial transaction can be displayed on a screen located on the card reader. The card reader can communicate with other devices, such as a computer, a laptop computer or a PDA and display the information regarding the transaction on these devices. These other devices may be in communication with printers or other devices which can provide a hard copy of the information should it be required.

The encryption feature of the microchip on the smart card can be used to gain access to a locked door, as in a hotel, or other secured areas. It can also be used to gain access to locked objects such as automobiles, etc.

Lottery ticket machines could be provided with Smart Card readers thereby eliminating the need of an employee, of the store selling the Lottery tickets, to operate the Lottery ticket machine and accept payment for the ticket.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention.

What is claimed is:

1. A gambling information storage device comprising:
   a tangible computer readable medium;
   a processor; and
   an interface unit;
   said tangible computer readable medium storing information for use in gambling;
   said information being stored in an encrypted format on said tangible computer readable medium;
   said processor operating on said information;
   said interface unit adapted to interface with an external reader device; and
   said processor being adapted to communicate said information to said external reader via said interface unit.

2. The gambling information storage device of claim 1, wherein said interface unit is adapted to receive power from said external reader device, when interfaced with said reader device, for powering said processor and said tangible computer readable medium.

3. The gambling record storage device of claim 1, wherein said storage device comprises a smart card chip.

4. The gambling information storage device of claim 1, wherein before said storage device communicates said information to said reader device;
   the processor of said storage device performs operations on authorization data received from said reader device to verify that said reader device is an authorized device to which said storage device is authorized to communicate said information; and
   if said reader device is verified as an authorized device, said storage device communicates said information to said reader device.

5. The gambling information storage device of claim 4, wherein:
   wherein said information comprises a plurality of types of information;
   said storage device stores a first type of said plurality of types of information with a first permission requirement and a second type of said plurality of types of information with a second permission requirement; and
   said storage device communicates, to said reader device, types of information for which said authorization data can provide permission.

6. The gambling information storage device of claim 5, wherein said gambling information storage device further stores information including at least one of an authorization number used to approve play at said gaming unit, a personal identification number, a transaction number that is used for all games of chance initiated using the account card, player identification information, player tracking information, a encrypted combination used by a door access device to unlock a door, access to complimentary amenities, an authorization number that is used to authorize wireless gaming, an authorization number that is used to authorize sports wagering, an authorization number that is used to authorize fantasy sports wagering, dining accounts, purchases, access to spa and health facilities, entertainment, and recreation.

7. The gambling information storage device of claim 1, wherein said gambling information storage device is substantially the size and shape of a credit card.

8. The gambling information storage device of claim 1, wherein said wherein said gambling information storage device allows a person to participate in at least one of slots, roulette, poker, blackjack, craps, baccarat, Caribbean poker, video poker, bingo, lottery, keno, fantasy sports game, and wireless gaming devices.

9. The gambling information storage device of claim 5, wherein said gambling information storage device further stores information related to access to complimentary amenities.

10. The gambling information storage device of claim 1, wherein before said external reader device is able to effect a change in said information, the processor of said storage device performs operations on authorization data received from said external reader device to verify that said external reader device is an authorized device which is authorized to effect a change in said information; and if said external reader device is verified as an authorized device, said external reader device is able to effect a change in said information.

11. The gambling information storage device of claim 10, wherein said information comprises a plurality of types of information;

said storage device stores a first type of said plurality of types of information with a first permission requirement and a second type of said plurality of types of information with a second permission requirement; and said external reader device is able to effect change of types of information stored on said storage device for which said authorization data can provide permission.

12. The gambling information storage device of claim 1, wherein said external reader device is comprised by a slot machine.

* * * * *